United States Patent
Lingier et al.

(10) Patent No.: US 12,460,097 B2
(45) Date of Patent: Nov. 4, 2025

(54) NIR ABSORBING INKJET INK, METHOD OF RECORDING

(71) Applicant: AGFA-Gevaert NV, Mortsel (BE)

(72) Inventors: Sophie Lingier, Mortsel (BE); Johan Loccufier, Mortsel (BE); Sonny Wynants, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 154 days.

(21) Appl. No.: 18/258,344

(22) PCT Filed: Dec. 20, 2021

(86) PCT No.: PCT/EP2021/086693
§ 371 (c)(1),
(2) Date: Jun. 20, 2023

(87) PCT Pub. No.: WO2022/136211
PCT Pub. Date: Jun. 30, 2022

(65) Prior Publication Data
US 2024/0301226 A1    Sep. 12, 2024

(30) Foreign Application Priority Data
Dec. 21, 2020 (EP) ................................. 20215901

(51) Int. Cl.
| | | |
|---|---|---|
| *C09D 11/322* | (2014.01) | |
| *B29B 7/80* | (2006.01) | |
| *B33Y 70/00* | (2020.01) | |
| *C09D 7/80* | (2018.01) | |
| *C09D 11/033* | (2014.01) | |
| *C09D 11/037* | (2014.01) | |
| *C09D 11/36* | (2014.01) | |
| *C09D 11/40* | (2014.01) | |
| *B29C 64/165* | (2017.01) | |
| *B29K 25/00* | (2006.01) | |
| *B29K 33/00* | (2006.01) | |
| *B29K 67/00* | (2006.01) | |
| *B29K 71/00* | (2006.01) | |
| *B29K 75/00* | (2006.01) | |
| *B29K 77/00* | (2006.01) | |
| *B29K 105/00* | (2006.01) | |
| *B29K 105/16* | (2006.01) | |
| *B33Y 10/00* | (2015.01) | |

(52) U.S. Cl.
CPC ............. *C09D 11/322* (2013.01); *B29B 7/80* (2013.01); *B33Y 70/00* (2014.12); *C09D 7/80* (2018.01); *C09D 11/033* (2013.01); *C09D 11/037* (2013.01); *C09D 11/36* (2013.01); *C09D 11/40* (2013.01); *B29C 64/165* (2017.08); *B29K 2025/06* (2013.01); *B29K 2033/00* (2013.01); *B29K 2067/00* (2013.01); *B29K 2071/00* (2013.01); *B29K 2075/00* (2013.01); *B29K 2077/00* (2013.01); *B29K 2105/0032* (2013.01); *B29K 2105/0064* (2013.01); *B29K 2105/16* (2013.01); *B29K 2995/0094* (2013.01); *B33Y 10/00* (2014.12)

(58) Field of Classification Search
None
See application file for complete search history.

(56) References Cited

U.S. PATENT DOCUMENTS

| | | | | |
|---|---|---|---|---|
| 2004/0187732 | A1* | 9/2004 | Roman | B32B 17/10761 347/100 |
| 2018/0016451 | A1* | 1/2018 | Okada | C09K 3/00 |
| 2018/0016460 | A1* | 1/2018 | Okada | C09D 7/67 |
| 2018/0272602 | A1* | 9/2018 | Rudisill | B29C 64/112 |
| 2018/0333914 | A1* | 11/2018 | Rudisill | B29C 64/165 |
| 2022/0219479 | A1* | 7/2022 | Demartin Maeder | B42D 25/23 |

FOREIGN PATENT DOCUMENTS

| | | |
|---|---|---|
| CN | 107429098 A | 12/2017 |
| CN | 107429099 A | 12/2017 |
| CN | 107532031 A | 1/2018 |
| CN | 108349156 A | 7/2018 |
| CN | 109890915 A | 6/2019 |
| CN | 110669379 A | 1/2020 |
| CN | 110885586 A | 3/2020 |
| CN | 111117366 A | 5/2020 |
| EP | 3543028 A2 | 9/2019 |
| GB | 2579687 A | 7/2020 |
| WO | WO 2015/068282 A1 | 5/2015 |
| WO | WO-2017069778 A1 * | 4/2017 ........... B29C 64/112 |
| WO | WO 2017/188961 A1 | 11/2017 |
| WO | WO 2017/188965 A1 | 11/2017 |

(Continued)

OTHER PUBLICATIONS

Ellis et al., "Materials for high speed sintering," *J. Mater. Res.*, 29(17): 2080-2085 (2014).
European Patent Office, International Search Report in International Patent Application No. PCT/EP2021/086693, mailed Apr. 19, 2022, 4 pp.
European Patent Office, Written Opinion in International Patent Application No. PCT/EP2021/086693, mailed Apr. 19, 2022, 5 pp.

*Primary Examiner* — Peter A Salamon
(74) *Attorney, Agent, or Firm* — Leydig, Voit & Mayer, Ltd.

(57) ABSTRACT

A non-aqueous inkjet ink comprising a near infrared absorbing particle, a dispersant, a solvent, the dispersant is a polymer comprising an amine group or an acidic group and the solvent is selected from the group consisting of ketones, esters, ethers and alcohols. The non-aqueous inkjet ink can act as a fusing agent in a high speed sintering process. The non-aqueous inkjet ink is suitable for printing transparent or coloured 3D-objects.

14 Claims, No Drawings

(56) References Cited

FOREIGN PATENT DOCUMENTS

| WO | WO 2017/188966 A1 | 11/2017 |
|----|-------------------|---------|
| WO | WO 2019/182576 A1 | 9/2019 |
| WO | WO 2020/239740 A1 | 12/2020 |

\* cited by examiner

NIR ABSORBING INKJET INK, METHOD OF RECORDING

CROSS-REFERENCE TO RELATED APPLICATIONS

This patent application is the U.S. national stage of copending International Patent Application No. PCT/EP2021/086693, filed Dec. 20, 2021, which claims the benefit of European Patent Application No. 20215901.8, filed Dec. 21, 2020.

TECHNICAL FIELD

The invention relates to a non-aqueous inkjet ink comprising NIR absorbing particles for use in 3D printing via the High Speed Sintering process.

BACKGROUND ART 3D printing is a rapidly developing technology for a number of applications. The applications are situated in the domain of rapid prototyping in the design phase of product development, tooling in preparing complex shapes such as in automotive or aircraft construction and in preparing customized shapes such as surgical and dental implants applications and personalized objects in fashion.

Within this technology sintering of polymer based powders or metal powders, is an emerging area. Structures and objects are generated by laser radiation to selectively sinter metal or polymer particles together to form individual parts.

An alternative route to selectively sinter polymer particles together is the use of infrared (IR) and near-infrared (NIR) lamps to fuse an entire layer of polymer particles, also called a polymer build material. Details of this process are described for example by Ellis, A., Noble, C., Hartley, L., Lestrange, C., Hopkinson, N., & Majewski, C. (2014). Materials for high speed sintering. Journal of Materials Research, 29(17), 2080-2085. doi:10.1557/jmr.2014.156.

In order to generate a pattern on the layer of polymer particles several options are available.

One option uses ink-jet printing of an infrared/near-infrared absorbing ink onto a polymer particle layer. The structure is printed onto the particles. Afterwards an NIR/IR lamp irradiates the area in such a way that only those polymer particles which have been covered by the IR/NIR absorbing ink are fused. Particles which have not been covered with the IR/NIR absorbing ink will not sinter and can be removed later. The build-up of a defined structure is achieved by repeated cycles of polymer particle layer, ink jet printing the structure and subsequent fusing by IR/NIR radiation. Finally, a 3D-printed object is obtained.

This process has been described as "High Speed Sintering" (HSS). Currently the process uses an inkjet ink which contains carbon black as an infrared absorbing agent. Carbon black is a very well known infrared absorbing material. However, a disadvantage of using carbon black, at the loadings currently required, means that only black or dark-grey coloured sintered parts can be achieved. It is not possible to provide colourless nor clear other coloured 3D-objects.

Typical inkjet inks for high speed sintering processes are described in WO 2017/188966 and WO 2017/188965. These documents describe the composition and requirements for an aqueous ink being used in an inkjet printer for submitting structural information onto a polymer particle layer, also called polymer bed.

WO 2017/188961 describes the use of a photo luminescent inkjet ink comprising photo luminescent materials and a fusing agent comprising carbon black, near infrared absorbing pigments, tungsten or molybdenum bronze or metal nanoparticles.

WO 2017/180164 discloses the combination of a conductive fusing ink comprising metal particles and a second fusing ink comprising carbon black or other near infrared absorbing pigments including tungsten and molybdenum bronzes or metal nanoparticles used in structuring polymeric powder beds for generation of 3D structures. These ink compositions of the prior art appear to be limited to aqueous systems.

These prior art documents do not provide any teaching on designing inks that have a non-aqueous ink vehicle and can be jetted by means of an inkjet head which is specifically designed for non-aqueous based inkjet inks. Some inkjet printing heads can indeed only use non-aqueous based inkjet inks. One of the reasons is that the ink chambers of the inkjet head do no comprise a protective coating to prevent corrosion due to the water present in an aqueous inkjet ink.

In order to transfer the 3D structure onto the polymer particle layers, it is necessary to incorporate near infrared absorbers (NIR absorbers) into the non-aqueous ink. This requires the NIR absorber materials to be converted either into a dispersion or into a product which can be easily dispersed in an ink vehicle. Incorporating NIR absorbing powders into a solvent based ink vehicle is a challenge. Most inorganic NIR materials are hydrophilic substances and are not compatible with organic solvents, especially those of non-polar nature.

US 2018/0016460 describes a solvent based dispersion comprising infrared absorbing tungsten oxide particles in petroleum based solvents as IR absorbing materials for acrylic resins. The dispersion includes a fatty acid dispersant which is soluble in the petroleum solvent.

US 2018/0016460 describes the dispersion of IR absorbing materials in non-polar petroleum based solvents. GB 2579687 discloses an additive for inkjet printing comprising a near infrared absorbing material. In order to obtain stable additive compositions in time, the surface of the near infrared absorbing particles has to be modified by at least two different surface modifying agents in the presence of aliphatic non-polar hydrocarbon solvents. These two prior art documents have in common that the dispersion step of the NIR absorbers has been performed in the presence of mineral oils such as non-polar petroleum based solvents or also called mineral oil hydrocarbons (MOHs). MOHs are complex chemical mixtures and comprise open-chain, often branched hydrocarbons (commonly named paraffins) and cyclic, saturated hydrocarbons (commonly named naphthenes). These solvents have the disadvantage that only a very limited number of dispersing agents are suitable to obtain stable dispersions and more particularly to obtain stable non-aqueous inkjet inks.

Another disadvantage of mineral oil hydrocarbons as the solvent for the dispersion preparation is the risk of ignition during the preparation and the transport of the solvent and the dispersion. Indeed, mineral oil hydrocarbons show a low level of conductivity which increases the risk of static charge build up during dispersion preparation. This risk can be decreased by adding a conductivity increasing compound to the solvent. However, this compound may have a negative effect on the quality and stability of the dispersion and also on the efficiency and quality of the fusing process of the polymer particles.

Furthermore, mineral oil hydrocarbons have toxicological risks as they may come into contact with the consumer handling the obtained 3D-object if not all solvents did evaporate during the build-up of the object. Following acute (short-term) health effects may occur immediately or shortly after exposure to MOHs. MOHs can irritate the skin causing a rash or burning feeling on contact. On top of that, operators of the 3D-printing equipment can be exposed to mineral oil mist in the workplace by breathing it in. The mineral oil mist is formed during the inkjet printing process and is caused by formation of very small satellite inkjet ink drops occurring together with the inkjet ink drop formation. As the building up of a 3D-object occurs via multiple layers and upon each layer inkjet ink has to be jetted, accumulation of mineral oil mist is very likely to occur, representing severe health risks.

In inkjet inks comprising NIR absorbing material, the amount of this material is kept as low as possible to keep the raw material cost price of the ink as low as possible. Consequently, the limited amount of dispersed NIR particles will not have a substantive increasing effect on the viscosity of the non-aqueous inkjet ink. As most non-aqueous solvents for inkjet inks show a very low intrinsic viscosity, the viscosity of the non-aqueous inkjet ink comprising dispersed NIR particles will be too low to lead to a reliable jetting behaviour with most commercial inkjet heads. In order to achieve a reliable jetting behaviour, each inkjet head type requires a minimal viscosity of the ink.

Viscosity increasing agents such as thickeners or rheology modifiers can be added to bring the viscosity into the desired range. However, if the amount of these compounds, which are mainly based on resins is too high, they may negatively impact the dispersion stability of the NIR particles in the non-aqueous inkjet ink as the resins may then strongly interact with the dispersing agent of the dispersion. Furthermore, the thickening behavior of many resins depends on the shear, also called a non-Newton behavior. For reliable ink jetting purposes, a Newtonian behavior is however required. Moreover, as these compounds are not volatile and hence remain in the ink during fusing, they also may impact negatively the efficiency and quality of the HSS process. The final 3D printed objects have to meet the mechanical behaviour requirements of the targeted applications.

Inkjet inks comprising carbon black as NIR absorber lead to printed objects which show a black or dark grey colour. Inkjet inks comprising NIR absorbing materials such as tungsten and molybdenum bronzes or metal nanoparticles lead to printed objects showing no substantial colour. To obtain dense coloured or white printed objects, additional inkjet heads have to be incorporated in the printing equipment for applying coloured inkjet inks together with the ink containing the NIR absorbing material such as disclosed in US 2018/333914A.

It would be highly beneficial to provide a non-aqueous inkjet ink formulation which is based on NIR absorbing nanoscale particles dispersed in solvents substantially free of mineral oil hydrocarbons, having a viscosity value to achieve reliable jetting behaviour with most commercially available inkjet heads and which can lead to coloured or white printed objects by including a white or colouring agent in the ink formulation.

SUMMARY OF INVENTION

It is an objective of the invention to provide a solution for the above stated problems. The objective has been achieved by a non-aqueous inkjet as defined in claim 1.

According to another aspect, the present invention includes an ink set to obtain coloured 3D-objects as defined in claim 10.

According to another aspect, the present invention includes a method for preparing an inkjet ink dispersing NIR particles in a solvent substantially free of mineral oil hydrocarbons as defined in claim 11.

According to another aspect, the present invention includes a method of 3D printing using the non-aqueous inkjet ink from claim 1 as defined in claim 13.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. NIR Absorbing Non-Aqueous Inkjet Ink

A.1. Dispersion of NIR Absorbing Particles
A.1.1. Solvent of the Dispersion of NIR Absorbing Particles In the preparation on the NIR absorbing non-aqueous inkjet ink of the invention, the NIR absorbing material is preferably dispersed in a solvent. Suitable solvents are ketones such as methyl ethyl ketone, methyl isobutyl ketone, cyclopentanone, cyclohexanone, acetone, methyl amyl ketone, diisobutyl ketone, diacetone alcohol and isophorone, ethers such as dipropylene glycol dimethyl ether, dipropylene glycol methyl butyl ether, diethylene glycol diethyl ether, diethylene glycol dimethyl ether, esters such as ethyl lactate, butyl lactate, γ-butyrolactone, methylated fatty acids, vegetable oils consisting out of triglycerides like tricaprate, soybean oil, linseed oil, . . . butyl glycol acetate, 2-methoxy ethyl acetate, 1-methoxy 2-propyl acetate, Dowanol DPMA, Dowanol PMA, alcohols such as butanol, polyglycols like glycerol, propane diol, ethylene glycol, tripropylene glycol, 1-methoxy 2 propanol, 1-ethoxy 2-propanol, 2-butoxy ethanol, ethylene glycol butyl ether, diethylene glycol monomethyl ether, diethylene glycol monobutyl ether, Dowanol DPM, Dowanol DPnB, Dowanol DPnP, Dowanol TPM. Preferable solvents which are particularly suitable for printing 3D-objects which may come into contact with the human skin are ethylene glycol, propylene glycol and propylene glycol ethers.

Contrary to mineral oil hydrocarbons, these solvents provide a big latitude towards the use of different dispersing agents. This enhanced latitude gives the designer or producer of non-aqueous inkjet inks for High Speed Sintering 3D printing method, the possibility to select the most appropriate dispersing agent in view of specific requirements of the ink (storage stability, compatibility with the ink vehicle, visco elastic behaviour of the ink, etc. . . . ) and its jetting behaviour in the inkjet head.

All above mentioned solvents do also show a higher conductivity than mineral oil hydrocarbons. Due to this higher conductivity, static charge build-up is very unlikely to occur, minimizing the risk of static discharge and ignition during production and transport of the dispersion.

A.1.2. Near Infra-Red Absorbing Material

Commercially available NIR lamps show a maximum output at around 1000 to 1100 nm. NIR absorbers that have an absorption maximum in that range typically provide the highest possible heat conversion rate. Such materials are therefore highly advantageous.

The NIR material of the present invention can be organic NIR absorbing material. Suitable organic NIR absorbing materials are infrared chromophores for the design of organic and hybrid near infrared absorbing particles and include, but are not limited to, polymethyl indoliums, metal complex infrared chromophores, polymethine chromophores, croconium chromophores, cyanine chromophores, merocyanine chromophores, squarylium chromophores, chalcogeno-pyryloarylidene chromophores, metal thiolate complex based chromophores, bis(chalcogenopyrylo)-polymethine chromophores, oxyindolizine chromophores, bis(aminoaryl)polymethine chromophores, indolizine chromophores, pyrylium chromophores, quinoid chromophores, quinone chromophores, phthalocyanine chromophores, naphthalo-cyanine chromophores, azo chromophores, (metalized) azomethine chromophores and combinations thereof.

Preferably the near infrared absorbing material is an inorganic NIR absorbing material. Inorganic NIR absorbing materials are favoured due to their broad absorption range. Any suitable NIR absorbing material can be used. Preferably the near infrared absorbing material is selected from one or more of:
doped tin oxides;
doped indium oxides;
alkali metal tungsten oxides;
rare earth hexaborides;
alkali and/or transition metal (poly)phosphates;
alkali and alkaline earth copper silicates; and
transparent inorganic conductive oxides.

The advantage of the above listed inorganic NIR absorbing material is their transparency leading to dispersions showing substantially no light absorption in the range of 400 to 700 nm. Transparent 3D printed objects can thus be obtained. Because the ink obtained by dispersing this inorganic NIR absorbing material, does not show any colour, it is particularly useful to combine these inks with a colorant, including a white colorant, to obtain coloured or white objects after fusing of polymeric powder particles. This colorant can be incorporated in an additional ink to form an ink set or the colorant can be added to the non-aqueous ink comprising the above listed inorganic NIR absorbing material.

The amount of the above listed inorganic NIR absorbing material in the non-aqueous inkjet ink of the invention is preferably equal to 0.3 wt. % or more, preferably 0.4 wt. % or more and 5 wt. % or less with respect to the total weight of the ink. An amount of NIR absorbing material of more than 5 wt. % increases the raw material cost of the ink and increases the light absorption in the visible light region leading to a coloration of the ink and hence of the 3D-printed object.

In some embodiments the NIR absorbing material is a doped tin oxide. The tin oxide may be doped with one or more elements selected from antimony, tungsten, phosphorus, copper, niobium, manganese, fluorine, nickel, vanadium, zinc, bismuth, indium, aluminium, europium, rare earth metals, iodine, chloride and nitrogen. In some embodiments the NIR absorbing materials comprises a doped indium oxide. Such materials are based on indium oxide in which some of the indium atoms have been replaced by one or more dopant elements. Suitable dopant elements include tin, zinc, aluminium, gallium and mixtures thereof.

In some embodiments the NIR absorbing material comprises an alkali metal tungsten oxide. Caesium tungsten oxide is especially preferred. The near infrared absorbing fine particles used in the present invention are one or more kinds selected from a composite tungsten oxide expressed by $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$), or a tungsten oxide having a Magneli phase expressed by a general formula $W_yO_z$ (W is tungsten, O is oxygen, satisfying $2.45 \leq z/y \leq 2.999$). Alkali metals are elements of Group 1 of a periodic table excluding hydrogen, alkaline earth metals are elements of Group 2 of the periodic table, rare earth elements are Sc, Y and lanthanoid elements.

In some embodiments the NIR absorbing material may comprise a surface modified caesium tungsten oxide. Preferred materials of this type are described, for example, in GB1815402.1.

Suitable NIR absorbing materials include those of formula $M^1{}_aM^2{}_b, W_cO_d(P(O)_nR_m)_e$, wherein each of M1 and M2 independently ammonium or a metal cation; a is 0.01 to 0.5, b is 0 to 0.5; c is 1, d is 2.5 to 3; e is 0.01 to 0.75; n is 1, 2 or 3, m is 1, 2 or 3; and R is an optionally substituted hydrocarbyl group. Preferably M1 is caesium and M2 is selected from the group consisting of alkali metals, zinc and tin. More preferably M1 is caesium, M2 is selected from sodium, potassium, tin or zinc; a is 0.22 to 0.4; b is 0.01 to 0.2; c is 1; d is 2.7 to 3; e is 0.05 to 0.25; n is 2; m is 1 and R is an unsubstituted alkyl or aryl group having 6 to 20 carbon atoms.

In some embodiments the NIR absorbing material comprises a rare earth hexaboride. Lanthanum hexaboride is especially preferred.

In some embodiments NIR absorbing material comprises an alkali metal and/or transition metal (poly)phosphate. Suitable compounds of this type include is copper hydroxy phosphate, zinc copper hydroxy phosphate, iron copper phosphate, tin copper phosphate, copper phosphate, zinc copper phosphate and manganese copper phosphate.

In some embodiments NIR absorbing material comprises an alkali and/or alkaline earth copper silicates. One suitable compound of this type is copper magnesium silicate.

In some embodiments, the NIR absorbing material comprises a transparent conducting oxide, which shows high transparency in the visible region but high absorption in the IR region. Suitable materials of this type include aluminium zinc oxide and zinc indium tin oxides.

A.1.3. Dispersant

The dispersant comprised in the non-aqueous inkjet ink according to the invention is a polymer having dispersing properties. Preferably the dispersant is a polymer comprising a functional group selected from the group consisting of an amino group and an acidic group or a salt thereof. The acid group is preferably a carboxylic acid group or a salt thereof.

The dispersant being a polymer comprising a matrixophilic fragment, having high affinity for the non-aqueous vehicle of the dispersion and/or ink and a pigmentophilic fragment, having high affinity for the surface of the NIR absorbing particle. The dispersants are preferably copolymers preferably selected from the group consisting of poly (esters), poly(acrylics), poly(urethanes), poly(amides), poly (ethers) and poly(styrenes) and combinations thereof. The polymers are preferably selected from the group consisting of block copolymers, graft copolymers, hyperbranched copolymers and comb copolymers. Preferred matrixophilic polymeric fragments are selected from the group consisting of an optionally post derivatized poly(ester), an optionally post derivatized poly(ether) and a poly((meth)acrylate), poly (esters) and poly(ethers) being more preferred. Poly(ester)

fragments based on caprolacton, valerolacton or combinations thereof are preferred matrixophilic fragments. Poly(ethylene glycols) and poly(propylene glycols) or copolymers thereof are preferred matrixophilic poly(ether) fragments.

The pigmentophilic part of the dispersing agent comprises at least one functional group selected from the group consisting of an acid, preferably a carboxylic acid or salt thereof and an amino group. The pigmentophilic part can be polymeric. A particularly preferred pigmentophilic part is a poly(ethylene imine). The amino group of the dispersant can be selected from the group consisting of a primary amine, a secondary amine and a tertiary amine, a tertiary amine being particularly preferred. The amino group of the dispersant can also be part of a cyclic structure such as in imidazoles and pyridines. Without being bound by any theory, it is thought that due to the presence of the electron pair onto the N-atom of the amino group, a high affinity towards the surface of the NIR-absorbing particle is achieved, resulting in a colloidal stable dispersion of the NIR-absorbing particles.

Branched poly(ethylene imine)-co-polyesters), poly(urethane)-co-poly(ethers) and poly(urethane)-co-poly(esters) are particularly preferred dispersing agents according to invention.

Suitable dispersants being a polymer having an amine group are Tego Dispers 1010, Disperbyk 162 and Bykjet 9152 from Byk Chemie, Solsperse 41000 from Lubrizol, EFKA PX4733 from BASF. Suitable dispersants being a polymer having carboxylic groups are Disperbyk 111 from Byk Chemie.

The weight ratio of NIR absorbing material over dispersant is preferably 20:1 to 1:2, more preferably 15:1 to 2:1, most preferably 10:1 to 3:1.

A. 1.4. Method for Dispersing the NIR Absorbing Particles in the Solvent

In order to disperse NIR absorbing particles in the non-aqueous ink of the invention, the NIR absorbing material is preferably dispersed in a solvent selected from the group consisting of ketones, esters, ethers and alcohols as listed in § A.1.1.

The method for dispersing comprises a step of making a pre-dispersion by mixing the dispersant, preferably being a polymer comprising an amine group or carboxylic group with a solvent selected from the group consisting of esters, ketones, ethers and alcohols with the near infrared absorbing material. Subsequently, high shear forces or milling is applied onto the obtained pre-dispersion such as to obtain a stable dispersion of near infrared absorbing particles.

The dispersion method for obtaining the near infrared absorbing particle dispersion in the solvent of the present invention, can be arbitrarily selected as long as this is a method for braking agglomerates of particles and evenly dispersing the particles in the solvent.

Equipment suitable for dispersing the NIR absorbing material include a pressure kneader, an open kneader, a planetary mixer, a dissolver, and a Dalton Universal Mixer. Other suitable milling and dispersion equipment include a ball mill, a pearl mill, a colloid mill, a high-speed disperser, double rollers, a bead mill, a paint conditioner, and triple rollers. The dispersion may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is preferably performed with cooling to prevent build-up of heat.

The concentration of the near infrared absorbing particles in the near-infrared absorbing particle dispersion liquid of the present invention is 10 to 60 wt. %, preferably 15 to 55 wt. %, and more preferably 25 to 50 wt. %. The higher the concentration of the near infrared absorbing particles in the dispersion is, the easier it is to adjust the amount of the NIR particles in the non-aqueous inkjet ink.

The particle size of the dispersed near infrared absorbing particles can be controlled by the treatment time of the high shear application or of the milling. More particularly, by increasing the treatment time, the NIR absorbing particles can be made smaller.

Preferably the NIR absorbing particles of the present invention have an average particle diameter of 1 µm or less, preferably 500 nm or less, more preferably 250 nm or less. If the average particle size is higher than these values, jetting reliability problems will occur due to clogging of inkjet head nozzles.

By means of the production method described above, a stable near infrared absorbing particle dispersion is obtained which can be used in the preparation of the NIR absorbing non-aqueous inkjet ink according to the invention.

A.2. Solvent of the Non-Aqueous Inkjet Ink

The NIR absorbing non-aqueous inkjet ink according to the invention comprises one or more solvents. Preferably the solvents are organic solvents. Suitable solvents are alcohols, ketones, esters, ethers, glycols, polyglycols and derivatives thereof, lactones, N-containing solvents such as amides or higher fatty acid ester and mixtures thereof.

The non-aqueous inkjet ink of the invention does preferably not contain a substantial amount of water, preferably the amount of water is 8 wt. % or less, preferably 5 wt. % or less more preferably 2 wt. % or less. If the amount of water is higher than these values, the stability of the dispersion may decrease and the risk of corrosion of the ink chambers and channels in the inkjet head may increase. The presence of water in the inkjet ink may also negatively affect the fusing process of the polymer particles and the mechanical properties of the printed 3D object.

Preferably the solvent of the same class in the ink is used as the solvent used in the NIR absorbing particle dispersion. This leads to more stable ink formulation. Without being bound by any theory, it is thought that a dispersant showing a high compatibility with the solvent of the dispersion, will also show a high compatibility with the solvent of the ink and hence will guarantee a colloidal stable ink. As mineral oil hydrocarbons are commonly not used in inkjet formulations for reasons of safety, dispersants used to stabilize NIR absorbing material in mineral oil hydrocarbons when preparing the NIR absorbing particle dispersion, will be less good in stabilising NIR absorbing particles in the ink formulation.

Organic solvents as the one described above have usually a low intrinsic viscosity leading to non-aqueous inkjet inks having viscosity values below the preferred viscosity range required for a reliable ink jetting behaviour in view of the used inkjet head type.

Depending on the inkjet head type, the viscosity of the ink must be increased to achieve reliable jetting. It has been found that glycerol esters from one, two or three long-chain fatty acids added to the solvent of the non-aqueous inkjet ink can increase the viscosity without having a negative impact on the stability of the ink, the NIR-radiation to heat conversion of the ink and the jetting reliability.

Suitable glycerol esters are glycerol esters from one, two or three long-chain fatty acids. The preferred amount of the glycerol ester from one, two or three long-chain fatty acids with respect to the weight of the ink composition is from 1.0 wt. % to 80.0 wt. %, more preferably 5.0 wt. % to 60 wt. % most preferably 15 wt. % to 50.0 wt. %. The amount is mostly determined by the viscosity requirements of the non-aqueous ink of the invention.

Long-chain fatty acids are carboxylic acids with a hydrocarbon chain having at least 8 carbon atoms, preferably at least 10 carbon atoms and most preferably at least 12 carbon atoms including the carbon atom of the carboxylic acid. The carbon chain can either be saturated or unsaturated and optionally further functionalized with additional functional groups such as hydroxyl groups.

Examples of suitable unsaturated long-chain fatty acids to form glycerol esters usable in the invention are: Myristoleic acid Palmitoleic acid, Sapienic acid, Oleic acid, Elaidic acid, Vaccenic acid, Linoleic acid, Linoelaidic acid, α-Linolenic acid, Arachidonic acid, Eicosapentaenoic acid, Erucic acid, and Docosahexaenoic acid. Ricinoleic acid is an example of a further functionalized long-chain fatty acid.

Examples of suitable saturated long-chain fatty acids to form glycerol esters usable in the invention are: capric acid, Myristic acid, Palmitic acid, Stearic acid, Arachidic acid, Behenic acid, Lignoceric acid and Cerotic acid.

Because glycerol ester from one, two or three long-chain fatty acids appear in nature as mixtures of different glycerol esters, mixtures of these esters can also be used in the invention. Typical examples are vegetable oils such as avocado oil, canola oil, coconut oil, corm oil, cottonseed oil, linseed oil, hempseed oil, olive oil, palm oil, peanut oil, safflower oil, soybean oil and sunflower oil. The vegetable oils can be (optionally partially) hydrogenated or further derivatized by oxidation giving e.g. oxidized or epoxidized vegetable oils.

Preferable mixtures of glycerol esters from one, two or three long-chain fatty acids are capric acid, oxidized rapeseed oil, castor oil and soybean oil.

A.3. Additives

The NIR absorbing non-aqueous inkjet ink according to the invention may further contain surfactants, antimicrobial agents, humectants, stabilizers, UV absorbers, anti-fading agents, rheology modifiers and colorants. Surfactants:

Preferably the non-aqueous inkjet ink comprises at least one surfactant for controlling the spreading and penetration into the polymeric particle bed.

The surfactant(s) can be anionic, cationic, non-ionic, or zwitter-ionic and are usually added in a total amount of less than 20 wt. % and particularly in a total amount of less than 10 wt. % based on the total weight of the inkjet ink.

Suitable surfactants include fluorinated surfactants, polysiloxane surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, X, 465 and TG available from AIR PRODUCTS & CHEMICALS INC.).

Humectants:

Humectants can be added to the non-aqueous inkjet ink according to the invention to prevent drying during operation at the nozzles of the inkjet head. The humectant is then added to the non-aqueous inkjet ink in an amount of 0.1 to 40 wt. %, more preferably 0.1 to 10 wt. %, and most preferably approximately 4.0 to 6.0 wt. % each based on the total weight of the non-aqueous inkjet ink.

Rheology Modifiers

Rheology modifiers are additives that preferably are added to the ink according to the invention to modify its rheological properties or to bring the viscosity into a desired viscosity range. If these additives increase the viscosity, they are also called thickeners.

Different classes of rheology modifiers can be identified which are suitable to be included in the ink according to the invention. Organic rheology modifiers are mainly polymers, such as modified polyurethanes, polyuria, modified polyamines, urea-urethanes, polyacrylates, styrene-acrylates, polyamides and cellulose.

A particularly suitable class of organic rheology modifiers show a thixotropic behaviour and are based either on ricinus oil derivatives, also called castor wax, or diamide waxes, commercially available as THIXATROL® or THIXCIN®. Within the inorganic rheology modifiers, fumed metal oxides and organoclays are suitable to be incorporated in the ink of the invention.

Suitable organoclays are bentonite and hectorite. Synthetic hectorite clays are commercially available, for example, from Southern Clay Products, Inc., and include Laponite; Lucenite SWN, Laponite S, Laponite XL, Laponite RD and Laponite RDS brands of synthetic hectorite.

Suitable fumed metal oxides are fumed silica or alumina. Suitable minerals like montmorillonite and synthetic phyllosilicates are also useable.

Colorants:

The non-aqueous inkjet ink according to the invention is particularly suitable to incorporate colorants such as dyes or pigments.

The pigments used may be black, white, cyan, magenta, yellow, red, orange, violet, blue, green, brown, mixtures thereof, and the like.

The colour pigment may be chosen from those disclosed by HERBST, Willy, et al. Industrial Organic Pigments, Production, Properties, Applications. 3rd edition. Wiley-VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 180, 185 and 213.

Particular preferred pigments are C.I. Pigment Yellow 120, 151, 154, 175, 180, 181 and 194. The most preferred yellow pigments are C.I. Pigment Yellow 120, 139, 150 and 155.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169,170, 175, 176, 184, 185, 188, 202, 206, 207, 210, 216, 221, 248, 251, 254, 255, 264, 270 and 272. Other preferred pigments are C.I. Pigment Red 122 and C.I. Pigment Violet 19.

Particular preferred pigments are C.I. Pigment Violet 1, 2, 19, 23, 27, 32, 37 and 39. Particular preferred pigments are C.I. Pigment Blue 15:1, 15:2, 15: 3, 15:4, 15:6, 16, 56, 60, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. A commercially available example is Cinquasia Magenta D4570 from BASF.

Carbon black is preferred as a pigment for the non-aqueous black inkjet ink because it always exhibits a warm brownish black tone.

Suitable black pigment materials include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. Additional examples of suitable pigments are disclosed in U.S. Pat. No. 5,389,133.

Also non-organic pigments can be advantageously dispersed according to the present invention. Particular preferred pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black.

Generally, pigments if added to the ink are preferably stabilized by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

Pigment particles in the non-aqueous inkjet ink of the invention be sufficiently small to permit free flow of the ink through the inkjet printing device, especially at the ejecting nozzles. It is also desirable to use small particles for maximum colour strength and to slow down sedimentation.

The average particle size of the pigment in pigmented inkjet ink should be between 0.005 and 15 μm. Preferably, the average pigment particle size is between 0.005 and 5 μm, more preferably between 0.005 and 1 μm, particularly preferably between 0.005 and 0.3 μm and most preferably between 0.040 and 0.250 μm. Larger pigment particle sizes may be used as long as the objectives of the present invention are achieved.

B. Ink Set

The NIR absorbing non-aqueous inkjet ink according to the invention can also be advantageously combined with a non-aqueous inkjet ink which comprises colorants such as dyes or pigments. The use of an ink set comprising i) the non-aqueous inkjet ink according to the invention and preferably comprising transparent NIR absorbers and ii) a non-aqueous inkjet ink comprising a colorant such as a pigment is very suitable for printing coloured 3D-objects.

In this preferred embodiment, the 3D printing system does include only one ink having the NIR absorbing transparent material. As this ink is currently more expensive than non-aqueous inks including a colorant, this allows to print coloured 3D objects in a cost effective way.

The NIR absorbing material is preferably transparent and not coloured in order to not interact with the colours on the non-aqueous ink comprising the colorant. Preferred NIR absorbing material is selected from the group consisting of:
doped tin oxides;
doped indium oxides;
alkali metal tungsten oxides;
rare earth hexaborides;
alkali and/or transition metal (poly)phosphates;
alkali and alkaline earth copper silicates; and
transparent inorganic conductive oxides In order to obtain a coloured printed 3D-object, the ink set has to be jetted on the same part of the polymer particle bed. Due to the fact that the inkjet ink comprising the colorant also has a non-aqueous vehicle, good mixing occurs on the polymer bed where both inks of the ink set of the invention have been jetted. This good mixing leads to an efficient fusing and a homogenous colouring of the printed object.

Preferable non-aqueous inkjet inks comprising a colorant are disclosed in EP1857510A.

C. 3D Printing Method

The 3D printing method of the invention according to the high speed sintering process comprises the subsequent steps of 1) applying via inkjet the NIR absorbing non-aqueous inkjet ink of the invention onto at least a part of a polymeric powder bed; and 2) irradiating the polymeric powder bed by means of IR radiation such as to at least partially melt the polymeric powder leading to the fusing or sintering of the areas which had been covered by the NIR absorbing non-aqueous inkjet ink. The NIR absorbing particles of the non-aqueous ink of the invention convert the light into heat, which is used to melt the polymer particles. As a result, the polymer powder particles fuse or sinter only in those areas, which had been printed with the non-aqueous inkjet ink of the invention.

The polymer powder particles, are present on a build area platform. The build area platform preferably receives the polymer powder particles from a build material supply. The build material platform comprises a support member such as a platen, a fabrication/print bed, a glass plate, or another build surface.

The build area platform may be moved in a direction along the z-axis, so that polymer powder particles may be delivered to the platform or to a previously formed part layer such as to build up an object via multiple fused layers. For the deposition of the NIR absorbing non-aqueous inkjet ink of the invention, the inkjet head may move along the x- and y-axis or the build area platform may be moved in a direction along the x- and y-axis.

The polymer powder particle distributor may be a blade (e.g. a doctor blade), a roller, a combination of a roller and a blade and/or any other device capable of spreading the polymer powder particles over the build area platform.

The polymer powder particle may be crystalline or semi-crystalline polymer particles or composite particles made up of polymer and ceramic.

Examples of semi-crystalline polymers include semi-crystalline thermoplastic materials with a wide processing window of greater than 5° C. (i.e., the temperature range between the melting point and the re-crystallization temperature).

Some specific examples of the semi-crystalline thermoplastic materials include polyamides (e.g. PA 11/nylon 11. PA 12/nylon 12. PA 6/nylon 6. PA 8/nylon 8. PA 9/nylon 9, PA 66/nylon 66. PA 612/nylon 612. PA 812/nylon 812. PA 912/nylon 912, etc.). Other examples of crystalline or semi-crystalline polymers suitable for use as the build polymer particles are polyolifines including polyethylene, polypropylene, and polyoxomethylene (i.e. polyacetals). Still other examples of suitable build material particles include polystyrene, polycarbonate, polyester, polyurethanes, other and blends of any two or more of the polymers listed herein.

The inkjet heads deliver drops of the non-aqueous inkjet ink according to the invention. The resolution ranging is from 300 drops per inch (DPI) up to 4800 DPI, preferably up to 2400 DPI, more preferably up to 1200 DPI, most preferably up to 360 dpi. Resolutions above these values will lead to prolonged printing time and hence prolonged production time of the 3D-object.

When the ink set according to the invention is used to obtain coloured fused polymer powder layers, the ink comprising the colorant is also preferably delivered via an inkjet head, more preferably at the same resolution as the non-aqueous inkjet ink comprising the NIR absorbing material.

The drop velocity may range from about 1 m/s to about 50 m/s and the firing frequency may range from about 1 kHz to about 100 kHz. In one embodiment each drop may be in the order of about 0.1 to 200 picoliters (pl) per drop, preferably 3 to 20 picoliters per drop.

If coloured objects have to be obtained, the non-aqueous inkjet ink comprising the NIR absorbing material may further comprise a colorant being a pigment or a dye. More particularly, white coloured objects are preferred for objects to be used as implants. White pigments can be incorporated in the ink according to the invention. NIR-absorbing particles showing no absorption between 400 and 700 nm such as metal oxides are particularly useful to obtain white coloured objects (see § A. 1.2).

The advantage of adding coloured colorants is that no coloured polymer powder particles have to be used. Especially for obtaining white objects, white coloured or non-coloured polymer powder particles can be used.

Moreover, if multiple NIR absorbing inks comprising a colorant are used, multi-coloured objects can be obtained, which is very difficult to be obtained with coloured powder particles. Another advantage of coloured NIR-absorbing inks is that no additional inkjet heads for jetting inks comprising a colorant are required in the printing equipment to obtain coloured 3D-objects.

In another embodiment, the jetting of the NIR absorbing non-aqueous inkjet ink comprising the NIR absorbing material may be accompanied with the jetting of a coloured inkjet ink, preferably a non-aqueous coloured inkjet ink. The jetting of the coloured inkjet ink may be performed before, during or after the jetting of the non-aqueous inkjet ink comprising the NIR absorbing material, but preferably on the same part of the polymeric powder bed on which the NIR absorbing non-aqueous ink is jetted. In another preferred embodiment, the NIR absorbing non-aqueous inkjet ink can be mixed with the non-aqueous inkjet ink comprising a colorant in the printing equipment, preferably in the supply channels of the inkjet head. The mixture of both inks is then jetted onto the polymer particles bed.

After the deposition of the NIR absorbing non-aqueous inkjet ink according to the invention and optionally the deposition of a non-aqueous inkjet ink comprising a colorant, the radiation occurs by means of a radiation source. A preferred radiation source may emit electromagnetic radiation having wavelengths ranging from 750 nm to 1 mm. As one example, the electromagnetic radiation may range from about 750 nm to 2 µm. As another example, the electromagnetic radiation may be blackbody radiation with a maximum intensity at a wavelength of about 1100 nm. The radiation source is preferably an infrared (IR) or near-infrared light source, such as IR or near-IR curing lamps, IR or near-IR light emitting diodes, or lasers with the desirable IR or near-IR electromagnetic wavelengths.

The NIR absorbing non-aqueous inkjet ink according to the invention is preferably jetted by means of a piezoelectric inkjet head. Piezoelectric inkjet heads may jet a broad range of ink drop volumes from 0.1 to 200 pl. Another advantage of piezoelectric inkjet heads for jetting the non-aqueous ink of the invention is that by modifying the wave form of the transducer, a high jetting reliability can be achieved. Preferable piezoelectric inkjet heads are the ones which are able to jet drop volumes between 42 and 100 pl. as described in EP 2420382 A, EP 2420383A, EP 2465678 A and EP 2371541A.

However, the inkjet heads for jetting the non-aqueous inkjet ink of the invention are not restricted to piezoelectric inkjet heads. Other inkjet printing heads can be used and include various types, such as a continuous type and, electrostatic and acoustic drop on demand types. Other suitable jetting heads for jetting the NIR absorbing ink, are valve-jet heads such as the one available from Zimmer Austria, Aerosol Jet heads such as the one available from Optomec and mechanical heads such as MEMJET-heads. Valve-jet heads can jet drop volumes from 0.5 nanolitres up to 10 µlitres.

D. Examples

D.1. Materials

All materials used in the following examples were readily available from standard sources such as Merck and ACROS (Belgium) unless otherwise specified.

Precip-162 is a solvent free high molecular weight block copolymer (Disperbyk 162) from which the stock solution was purchased at BYK Chemie. This block copolymer contains amino groups.

Solsperse 41000 is a polymeric alkoxylate dispersant supplied by Lubrizol and contains amino groups.

Bykjet 9152 is a structured acrylate copolymer from BYK Chemie and contains amino groups.

EFKA PX4733 is a high molecular weight dispersant manufactured by BASF and contains amino groups.

Solsperse J560 is a hyperdispersant in a 30-40 wt. % solution of mineral oil hydrocarbon Synperonic PE/P94 is an ethylene oxide-propylene oxide copolymer from CRODA CHEMICALS INTERNATIONAL LTD Disperbyk 111 is a copolymer with acidic groups, manufactured by BYK Chemie Rhodafac RM710 is a mixture of CASRN39464-64-7 (60-70%), CASRN68891-21-4 (20-25%), CASRN68412-54-4 (10-15%) and CASRN7664-38-2 (1-3%), supplied by Solvay Solsperse 32000 is a polymeric dispersant manufactured by Lubrizol BGA: Butyl Glycol Acetate with CASRN112-07-2 purchased from DOW CHEMICAL N-paraffin with CASRN 64771-72-8 (C5-C20) supplied by LEUNA-Tenside GmbH MEK: methyl ethyl ketone Tricapr: Capric acid with CASRN73398-61-5 purchased from ESTERCHEM P.V.19: Magenta pigment violet 19 is a magenta pigment under the tradename Ink Jet Magenta E5B 02, manufactured by Clariant Surfynol 104 is a 72-76 wt. % solution of a wetting agent with CASRN126-86-3 (2,4,7,9-Tetramethyl-5-decyne-4,7-diol) in ethylene glycol supplied by KEYSER & MACKAY CTO-1: Caesium Tungsten Oxide, a NIR absorbing material, the particles having a substantive negative zeta potential, CASRN189619-69-0, supplied by KEELING & WALKER LIMITED CTO-2: Caesium Tungsten Oxide, a NIR absorbing material with CASRN52350-17-1, supplied by KCNTECH PA12: Polyamide 12 ultrafine polymer powder with a particle size of 10 μm, manufactured by ORGASOL SBO: soybean oil REM 8 21 P: Blown rapeseed oil (rapes. Oil) with CASRN95193-59-2, manufactured by OLEON PVCAC: Poly(vinylchloride-c-vinylacetate) powder, manufactured by DOW CHEMICAL P.B. 15:4: pigment blue 15:4 under the tradename HOSTAPERM BLUE P-BFS, purchased from Clariant P.Y.120: pigment yellow 120 with tradename Novoperm yellow H2G, supplied by Clariant Solsperse 39000 is a polymeric dispersant provided by Lubrizol P.Bl.7: pigment black 7 under the trade name Printex 90 was manufactured by Printex Dowanol DPM with CASRN34590-94-8, supplied by DOW CHEMICAL DEGDEE: Diethylene glycol-diethyl ether TEGMBE: Triethylene glycol monobutyl ether TeEGDME: Tetraethylene glycol dimethyl ether Solthix 250 is a solution of 40% active rheology modifier in 2-methoxy-1-methylethyl acetate with CASRN108-65-6, manufactured by NOVEON Rheobyk-H 370 is a mixture of thickeners (37.5%), 2-(2-butoxyethoxy)ethanol with CASRN112-34-5 (12.5-20%) and 2-methyl-isothiazol-3-one with CASRN2682-20-4 (0.0015-0.1%), manufactured by BYK CHEMIE GMBH Claytone 40: bentonite with CASRN85595-39-7 is a organophilic phyllosilicate manufactured by BYK CHEMIE GMBH PP: Ultrasint® PP Nat 01, a polypropylene powder from BASF P.W.6: Tiona 834 was bought at Tronox Pigments bv.

D.2. Measuring Methods

D.2.1. Average Particle Size

The average particle size of the NIR absorbing particles and pigment particles was measured using a Zetasizer™ Nano-S (Malvern Instruments, Goffin Meyvis) based upon the principle of dynamic light scattering. For reliable ink jetting characteristics (jetting quality and print quality), the average particle size of the dispersed particles is preferably below 250 nm.

D.2.2. Viscosity of the Dispersion

The viscosity of the NIR absorbing particle dispersion was evaluated with an Anton Paar MCR302 Rheometer in a cone plate set-up. The viscosity is measured at a shear rate of 10 s$^{-1}$ at a temperature of 25° C.

D.2.3. Colloidal Stability of the Inkjet Ink

An inkjet ink is considered colloidal stable if the average particle size did not increase by more than 15% after a storage of 7 days at 60° C. The inkjet ink is further considered colloidal stable if the viscosity did not increase by more than 10% after a storage of 7 days at 60° C. The inkjet ink is further considered colloidal stable if the particles show a homogeneous distribution when inspected visually by means of a microscope at a magnification of 64. The viscosity of the inkjet ink was measured by measuring the ink flow rate under gravity, using a glass capillary viscometer.

D.2.4. Ink Jetting Performance

Jetting performance of the ink was evaluated using a Dimatix™ DMP2831 system, equipped with a standard Dimatix™ 10 pl print head. The ink was jetted at 23° C., using a firing frequency of 5 kHz, a firing voltage of 25 V and a standard waveform. The occurrence of jetting and possible nozzle clogging is visually evaluated. The jetting was repeated several times to confirm the reliability of the jetting process.

D.2.5. Fusing of Polymer Particles by Irradiation of the NIR Absorbing Ink.

A rectangular shaped build area platform is created with 4 microscope slides (width of 26 mm, length of 76 mm, height of 0.7 mm) on a glass plate holder (width of 10 cm, length of 14 cm, height of 0.4 cm). The rectangular shape was filled with polymer powder. The powder was carefully pressed until it formed a flat polymeric powder bed on the glass plate. In a following step, the cartridge of a Dimatix printer was filled with non-aqueous inkjet ink and the print settings were set as described in § D.2.4. A rectangular image over the whole width of the build area platform was printed with the non-aqueous inkjet inks.

The fusing was initiated by switching on the NIR lamp after which the power was increased to the working intensity. The NIR lamp from Adphos (type NIR HB-15-125) radiates between 800 and 1500 nm. The build area platform with the printed samples was put on a conveyor belt, which was set at a speed of 3 m/min and which allow multiple passes under the NIR lamp of the printed samples. The distance between the polymeric powder bed and the NIR lamp amounts to 5 cm. The fusing of the printed area was checked by lifting up the printed part of the polymer particle bed with a needle. If the printed part formed a film, fusing of the polymeric powder particles occurred.

D.3. Example 1

Example 1 shows that the NIR-absorbing non-aqueous ink of the invention shows a stable colloidal behaviour, even after storage at elevated temperature. The ink is also able to fuse polymeric powder particles after NIR electromagnetic radiation.

Preparation of NIR Absorbing Particle Dispersions

The NIR absorbing particle dispersions were prepared according to the following general recipe. All quantities are given in wt. % with respect to the total weight of the dispersion. 60 wt. % of the solvent, 10 wt. % of the dispersant and 30 wt. % of the NIR absorbing material were premixed in a vessel using a mechanical stirrer to obtain a pre-dispersion. A DynoMill-RL mill was filled for 42% with 0.4 mm yttrium stabilized zirconia beads ("high wear resistant zirconia grinding media" from TOSOH Co.). The pre-dispersion was pumped into the bead mill and the milling was started in re-circulation mode at a rotation speed of 11.8 m/s. After 10 min residence time, the mill was emptied by pumping the obtained NIR absorbing particle dispersion in a vessel.

11 comparative and 10 inventive NIR absorbing particle dispersions were as such prepared. The ingredients used, are listed in Table 1.

TABLE 1

| Dispersion No. | Solvent | Dispersant | NIR absorbing material |
| --- | --- | --- | --- |
| COMPDISP-1 | N-paraffin | Precip-162 | CTO-1 |
| COMPDISP-2 | N-paraffin | Solsperse 41000 | CTO-1 |
| COMPDISP-3 | N-paraffin | BYKJET 9152 | CTO-1 |
| COMPDISP-4 | N-paraffin | EFKA PX 4733 | CTO-1 |

TABLE 1-continued

| Dispersion No. | Solvent | Dispersant | NIR absorbing material |
|---|---|---|---|
| COMPDISP-5 | N-paraffin | SolsperseJ560 | CTO-1 |
| COMPDISP-6* | N-paraffin | SolsperseJ560 | CTO-1 |
| COMPDISP-7 | N-paraffin | Synperonic PE/P94 | CTO-1 |
| COMPDISP-8 | N-paraffin | Disperbyk 111 | CTO-1 |
| COMPDISP-9 | N-paraffin | Rhodafac RM710** | CTO-1 |
| COMPDISP-10 | BGA | Synperonic PE/P94 | CTO-1 |
| COMPDISP-11 | BGA | Rhodafac RM710* | CTO-1 |
| INVDISP-1 | BGA | Precip-162 | CTO-1 |
| INVDISP-2 | BGA | Solsperse 41000 | CTO-1 |
| INVDISP-3 | BGA | BYKJET 9152 | CTO-1 |
| INVDISP-4 | BGA | EFKA PX 4733 | CTO-1 |
| INVDISP-5 | BGA | Disperbyk 111 | CTO-1 |
| INVDISP-6 | BGA | Precip-162 | CTO-2 |
| INVDISP-7 | BGA | Solsperse 41000 | CTO-2 |
| INVDISP-8 | BGA | EFKA PX 4733 | CTO-2 |
| INVDISP-9 | MEK | Solsperse 41000 | CTO-1 |
| INVDISP-10 | MEK | EFKA PX 4733 | CTO-1 |

*COMPDISP-6 was prepared with 50 wt. % CTO and 5 wt. % dispersant
**The Rhodafac RM710 dispersant was added in an amount of 3 wt. % instead of 10 wt. % and 67 wt. % of solvent with respect to the total weight of the dispersion as this structure is known to work more efficiently for dispersing.

The evaluation of the overall quality of the dispersion was done by measuring the particle size and the viscosity of the freshly made dispersion. The average particle size should be preferably equal to 250 nm or lower to assure a reliable jetting of the ink comprising the dispersion. The viscosity of the dispersion should be preferably not higher than 25 mPa·s because this would than indicate that gel formation is taking place in the solvent. After a storage of the dispersion for one week at 60° C., the increase in particle size is measured and the dispersed particle distribution is visually judged by means of a microscope at a magnification of 64.

The above described parameters are all taken into account in making the evaluation of the dispersion quality. The criteria for making the quality evaluation are summarized in Table 2.

TABLE 2

| Particle size | Viscosity | Particle size increase after storage | Visual appearance after storage | Ranking |
|---|---|---|---|---|
| ≤250 nm | ≤25 mPa·s | ≤50% | OK | 1 |
| ≤250 nm | ≤25 mPa·s | ≥50% | OK | 2 |
| ≥250 nm | Gel formation/ undissolved dispersant/ precipitation | ≥50% | Not OK | 3 |

The results of the evaluation of the prepared dispersions according to the criteria of Table 2 are summarized in Table 3.

TABLE 3

| Dispersion | Particle size (nm) | Viscosity (mPa·s) | Dispersion quality |
|---|---|---|---|
| COMPDISP-1 | 2806 | Gel formation | 3 |
| COMPDISP-2 | n.a.* | n.a.* | 3 |
| COMPDISP-3 | n.a.* | n.a.* | 3 |
| COMPDISP-4 | n.a.* | n.a.* | 3 |
| COMPDISP-5 | 167 | 4.6 | 1 |
| COMPDISP-6 | 105 | 23.1 | 1 |
| COMPDISP-7 | 537 | n.a.*** | 3 |
| COMPDISP-8 | n.a.* | n.a.* | 3 |
| COMPDISP-9 | 1007 | n.a.*** | 3 |
| COMPDISP-10 | 4200 | n.a.*** | 3 |
| COMPDISP-11 | 418 | n.a.*** | 3 |
| INVDISP-1 | 108 | 8.0 | 1 |
| INVDISP-2 | 106 | 5.7 | 1 |
| INVDISP-3 | 107 | 7.3 | 1 |
| INVDISP-4 | 112 | 10.0 | 1 |
| INVDISP-5 | 95 | 3.0 | 1 |
| INVDISP-6 | 149 | 9.0 | 1 |
| INVDISP-7 | 138 | 5.8 | 1 |
| INVDISP-8 | 146 | 9.0 | 1 |
| INVDISP-9 | 118 | Low** | 1 |
| INVDISP-10 | 102 | Low** | 1 |

*Dispersant did not dissolve in the solvent used for the dispersion preparation
**viscosity was not measured as the dispersion visually looked low viscous
***precipitation of the particles in the dispersion From the results of Table 3 it can be concluded that making NIR-absorbing particle dispersions with mineral oil hydrocarbon as a solvent has major drawbacks. Only one dispersant (solsperse J560) which is specially designed for mineral oil media, is able to stabilise sufficiently the NIR absorbing particles with acceptable quality. All other dispersants did not seem fit for use to obtain a stable dispersion. On the other hand, when a solvent from the class of esters or ketones (e.g. BGA or MEK) was used, much more latitude to use different dispersants to obtain a stable dispersion is obtained. Dispersants having no amine or carboxylic groups are unable to stably disperse NIR absorbing particles in esters or ketones.

From the comparison of different NIR absorbing materials, it seems that the surface property of the material does not substantially influence the stability of the dispersion when BGA as solvent and dispersants having an amine or a carboxylic group, have been used in the preparation of the dispersions.

Preparation of the NIR Absorbing Non-Aqueous Inks

NIR absorbing non-aqueous inks were prepared according to the composition listed in Table 4 on a 50 g scale. If used, the vegetable oil was firstly added to an Erlenmeyer flask in which the ink is to be prepared. If Claytone 40 as rheology modifier is incorporated in the ink, a 5 wt. % pre-dispersion was prepared by milling the Claytone 40 powder for 3-5 days in butyl-L-lactate. The second solvent was subsequently added, followed by the desired amount of the dispersion. Finally, the wetting agent was added to the mixture, which was then stirred for another 5 minutes. In all the examples below, the wetting agent Surfynol 104 was added in the amount of 1 wt. %. Hereafter, the mixture was filtered over a 1.6 μm syringe filter (Whatman 25 mm GD/X disposable device).

TABLE 4

| Ink | Solvent 1 (wt. %) | Solvent 2 (wt. %) | Dispersion (wt. %) | Additive (wt. %) |
|---|---|---|---|---|
| COMPINK-1 | N-paraffin 84.9% | REM 8 21 P 14% | COMPDISP-6 (2%) | — |

TABLE 4-continued

| Ink | Solvent 1 (wt. %) | Solvent 2 (wt. %) | Dispersion (wt. %) | Additive (wt. %) |
| --- | --- | --- | --- | --- |
| COMPINK-2 | Tricapr 44.5% | Butyl lactate 44.5% | COMPDISP-5 (10%) | — |
| COMPINK-3 | 1,2- propane diol 29.5% | Butyl lactate 59.5% | COMPDISP-5 (10%) | — |
| COMPINK-4 | N-paraffin 44.5% | MEK 44.5% | COMPDISP-5 (10%) | — |
| COMPINK-5 | Dowanol DPM 44.5% | SBO 44.5% | COMPDISP-5 (10%) | — |
| COMPINK-6 | N-paraffin 44.5% | SBO 44.5% | COMPDISP-5 (10%) | — |
| INVINK-1 | Tricapr 44.5% | Butyl lactate 44.5% | INVDISP-1 10% | — |
| INVINK-2 | Tricapr 47% | Butyl lactate 47% | INVDISP-1 5% | — |
| INVINK-3 | Tricapr 48.25% | Butyl lactate 48.25% | INVDISP-1 2.5% | — |
| INVINK-4 | Tricapr 49% | Butyl lactate 49% | INVDISP-1 1.0% | — |
| INVINK-5 | Tricapr 49.34% | Butyl lactate 49.34% | INVDISP-1 0.33% | — |
| INVINK-6 | SBO 44.5% | Butyl lactate 44.5% | INVDISP-1 10% | — |
| INVINK-7 | SBO 35.6% | Butyl lactate 53.4% | INVDISP-1 10% | — |
| INVINK-8 | SBO 26.7% | Butyl lactate 62.3% | INVDISP-1 10% | — |
| INVINK-9 | Tricapr 57.4% | Butyl lactate 38.3% | INVDISP-1 3.33% | — |
| INVINK-10 | Tricapr 17.8% | Butyl lactate 71.2% | INVDISP-1 10% | — |
| INVINK-11 | Tricapr 8.9% | Butyl lactate 80.1% | INVDISP-1 10% | — |
| INVINK-12 | Tricapr 0% | Butyl lactate 89% | INVDISP-1 10% | — |
| INVINK-13 | Tricapr 44.5% | Butyl lactate 44.5% | INVDISP-6 10% | — |
| INVINK-14 | Tricapr 44.5% | Butyl lactate 44.5% | INVDISP-5 10% | — |
| INVINK-15 | — | Butyl lactate 88.5% | INVDISP-1 10% | Solthix 250 0.5% |
| INVINK-16 | — | Butyl lactate 88% | INVDISP-1 10% | Solthix 250 1% |
| INVINK-17 | — | Butyl lactate 87% | INVDISP-1 10% | Solthix 250 2% |
| INVINK-18 | — | Butyl lactate 86% | INVDISP-1 10% | Solthix 250 3% |
| INVINK-19 | — | Butyl lactate 85% | INVDISP-1 10% | Solthix 250 4% |
| INVINK-20 | — | Butyl lactate 84% | INVDISP-1 10% | Solthix 250 5% |
| INVINK-21 | — | Butyl lactate 88.8% | INVDISP-1 10% | Rheobyk-H 370 0.2% |
| INVINK-22 | — | Butyl lactate 88.5% | INVDISP-1 10% | Rheobyk-H 370 0.5% |
| INVINK-23 | — | Butyl lactate 88% | INVDISP-1 10% | Rheobyk-H 370 1% |
| INVINK-24 | — | Butyl lactate 86% | INVDISP-1 10% | Rheobyk-H 370 3% |
| INVINK-25 | — | Butyl lactate 84% | INVDISP-1 10% | Rheobyk-H 370 5% |
| INVINK-26 | — | Butyl lactate 88.5% | INVDISP-1 10% | Claytone 40 0.5% |
| INVINK-27 | — | Butyl lactate 88% | INVDISP-1 10% | Claytone 40 1% |
| INVINK-28 | — | Butyl lactate 87% | INVDISP-1 10% | Claytone 40 2% |
| INVINK-29 | — | Butyl lactate 86% | INVDISP-1 10% | Claytone 40 3% |

The viscosity and colloidal stability of the obtained inks after storage was evaluated according to the methods described in § D.2.3. The storage of the ink was 7 and 14 days at 60° C.

The results are listed in Table 5

TABLE 5

| Ink | Viscosity (mPa · s) | Colloidal stability after 7 days storage at 60° C. | Colloidal stability after 14 days storage at 60° C. |
|---|---|---|---|
| COMPINK-1 | 10.2 | NOK | NOK |
| COMPINK-2 | n.a.* | NOK | NOK |
| COMPINK-3 | n.a.** | NOK | NOK |
| COMPINK-4 | n.a.* | NOK | NOK |
| COMPINK-5 | n.a.* | NOK | NOK |
| COMPINK-6 | n.a.** | NOK | NOK |
| INVINK-1 | 7.75 | OK | OK |
| INVINK-2 | — | OK | OK |
| INVINK-3 | 8.0 | OK | OK |
| INVINK-4 | — | OK | OK |
| INVINK-5 | 8.25 | OK | OK |
| INVINK-6 | 12.5 | OK | OK |
| INVINK-7 | 9.5 | OK | OK |
| INVINK-8 | 7.5 | OK | OK |
| INVINK-9 | 9 | OK | OK |
| INVINK-10 | 5 | OK | OK |
| INVINK-11 | 4.25 | OK | OK |
| INVINK-12 | 3.75 | OK | OK |
| INVINK-13 | 7.5 | OK | OK |
| INVINK-14 | 7.5 | OK | NOK |
| INVINK-15 | 5.24 | OK | OK |
| INVINK-16 | 6.00 | OK | OK |
| INVINK-17 | 7.78 | OK | OK |
| INVINK-18 | 10.23 | OK | OK |
| INVINK-19 | 13.21 | OK | OK |
| INVINK-20 | 16.62 | OK | OK |
| INVINK-21 | 3.69 | OK | n.m. |
| INVINK-22 | 4.03 | OK | n.m. |
| INVINK-23 | 4.44 | OK | n.m. |
| INVINK-24 | 5.85 | OK | n.m. |
| INVINK-25 | 8.14 | OK | n.m. |
| INVINK-26 | 4.31 | NOK | n.m. |
| INVINK-27 | 4.70 | NOK | n.m. |
| INVINK-28 | 6.35 | NOK | n.m. |
| INVINK-29 | 7.75 | OK | n.m. | n.a.*: ink flocculates so viscosity could not be measured
n.a.**: ink shows phase separation so viscosity was not measured
n.m.: not measured From Table 5 it follows that the non-aqueous inkjet inks comprising a dispersion of CTO-1, prepared in an BGA or MEK as a solvent and using a polymeric dispersant having a functional group being an amine or carboxylic group show a stable colloidal behaviour, contrary to the inks comprising the CTO-1 prepared in a mineral oil hydrocarbon (=COMPDISP-5 & COMPDISP-6).

From the results in Table 5 it can further be concluded that the use of glycerol esters from one, two or three long-chain fatty acids such as soybean oil, can increase the viscosity of the ink without negatively affecting the stability and quality of the ink.

Inks comprising a dispersant having amino groups show a somewhat better colloidal stable behaviour with respect to inks comprising a dispersant having carboxylic groups (INVINK-14). However, it is to be understood that by fine tuning the ink formulation, it should be possible to improve the colloidal stability of inks based upon a dispersant having carboxylic groups to the same level as for inks based upon a dispersant having an amine group.

Additives can also increase the viscosity of the ink with increasing added content as can be seen from the results in Table 5. Stable inks could be obtained with different additives but best results were realized with the polymeric rheology modifiers.

Results of Jetting and Fusing Tests

Some of the above listed NIR-absorbing inkjet inks were jetted and their ability to act as a fusing agent to fuse different polymeric powder particles was tested as described in § D.2.4 and § D.2.5. The ink was left to settle for 24h before starting with the jetting tests. The results are summarized in Table 6.

TABLE 6

| INK | Polymer powder | Intensity NIR-lamp (%) | Number of passes | Jetting | Polymer powder fusing |
|---|---|---|---|---|---|
| INVINK-1 | PA12 | 55 | 2 | OK | Yes |
| INVINK-2 | PA12 | 55 | 4 | OK | Yes |
| INVINK-3 | PA12 | 77 | 4 | OK | Yes |
| INVINK-1 | PP | 51 | 2 | OK | YES |

The results of Table 6 show that the inventive inks can act as a fusing agent for fusing different polymeric powder particles by means of NIR radiation. The inventive inks showed an acceptable jetting performance.

D.4. Example 2

In this example, it is shown that a colorant can be added to the NIR absorbing non-aqueous inkjet ink of the invention. This makes it possible to obtain coloured 3D-objects.

Preparation of a Magenta Pigment Dispersion M-DISP

The magenta dispersion M-DISP was prepared by mixing 55 wt. % BGA, 15 wt. % Precip-162 and 30 wt. % P.V.19 in a vessel using a mechanical stirrer to obtain a pre-dispersion. The wt. % refers to the total weight of the dispersion. A DynoMill-RL mill was filled for 42% with 0.4 mm yttrium stabilized zirconia beads ("high wear resistant zirconia grinding media" from TOSOH Co.). The pre-dispersion was pumped into the bead mill and the milling was started in re-circulation mode at a rotation speed of 11.8 m/s. After 25 min residence time, the mill was emptied by pumping the dispersion in a vessel.

Preparation of NIR Absorbing Non-Aqueous Inkjet Inks Comprising a Colorant

The inks were prepared the same way as in Example 1 with the exception that the magenta dispersion M-DISP was added after the addition of the NIR absorbing particle dispersion. The amounts of the ingredients of the NIR absorbing non-aqueous inkjet inks listed in Table 7 are in wt. % with respect to the total weight of the ink.

TABLE 7

|  | COMPINK-7 | INVINK-15 | INVINK-16 | INVINK-17 |
|---|---|---|---|---|
| INVDISP-1 | 0 | 10 | 5 | 2.5 |
| M-DISP | 13.3 | 13.3 | 13.3 | 13.3 |
| Tricapr | 42.85 | 37.85 | 37.85 | 37.85 |
| Butyl lactate | 42.85 | 37.85 | 37.85 | 37.85 |
| Surfynol 104 | 1.0 | 1.0 | 1.0 | 1.0 |

Viscosity and colloidal stability of the inks of Table 7 were measured according to the methods described in § D.2.3. The results are summarised in Table 8.

TABLE 8

| INK | Viscosity (mPa · s) | Colloidal stability after 7 d at 60° | Colloidal stability after 14 d at 60° |
|---|---|---|---|
| COMPINK-7 | 10 | OK | OK |
| INVINK-15 | 9.75 | OK | OK |

TABLE 8-continued

| INK | Viscosity (mPa · s) | Colloidal stability after 7 d at 60° | Colloidal stability after 14 d at 60° |
|---|---|---|---|
| INVINK-16 | — | OK | OK |
| INVINK-17 | 10 | OK | OK |

From Table 8 it can be concluded that the presence of a colorant in the NIR-absorbing non-aqueous inkjet ink of the invention does not negatively impact the viscosity and the colloidal stability of the ink. As the NIR absorbing material in the inventive inks is transparent and substantially not coloured, the colour of the inventive inks of Table 8 is the one from the colorant added, hence the magenta pigment.

Some of the above listed NIR-absorbing inkjet inks were jetted and their ability to act as a fusing agent to fuse polymeric powder particles was tested as described in § D.2.5. At the same time the colour of the fused parts was visually evaluated. The results are summarized in Table 9

TABLE 9

| Ink | Intensity of the NIR lamp (%) | Number of passes | Fusion | Colour of fused parts |
|---|---|---|---|---|
| COMPINK-7 | 65 | 6 | No | — |
| INVINK-15 | 55 | 2 | Yes | Blueish Magenta |
| INVINK-16 | 55 | 2 | Yes | Magenta |
| INVINK-17 | 65 | 2 | Yes | Magenta |

From Table 9 it can be concluded that the presence of a colorant in the non-aqueous inkjet ink of the invention does not negatively impact the ability to fuse polymeric powder particles by means of NIR radiation. The presence of the magenta colorant makes it moreover possible to obtain magenta coloured 3D-objects. No need to use specifically coloured polymer powder particles.

As an extra evaluation the inks INVINK-15, INVINK-16 and INVINK-17 were printed 2 times over the same rectangle of the polymer powder bed to achieve a deeper colour of the polymer particles. This extra step did not affect the fusing process.

Preparation of a White Dispersion

A white dispersion was prepared by mixing 40 wt. % BGA, 10 wt. % Precip-162 and 50 wt. % P.W.6 in a vessel using a mechanical stirrer to obtain a pre-dispersion. The wt. % refers to the total weight of the dispersion. A DynoMill-RL mill was filled for 42% with 0.4 mm yttrium stabilized zirconia beads ("high wear resistant zirconia grinding media" from TOSOH Co.). The pre-dispersion was pumped into the bead mill and the milling was started in re-circulation mode at a rotation speed of 11.8 m/s. After 5 min residence time, the mill was emptied by pumping the dispersion in a vessel. The dispersion showed a colloidal stable behaviour.

D.5. Example 3

Example 3 shows that by using an ink set comprising the NIR absorbing non-aqueous inkjet ink and an ink comprising a colorant and organic solvent, coloured 3D-printed objects can be obtained.

In Table 10 an ink set is listed comprising the NIR absorbing ink INVINK-1 together with organic solvent based inkjet inks comprising each a magenta, yellow, cyan, black or white pigment.

TABLE 10

| NIR-absorbing ink | Ink comprising colorant | Ink comprising colorant | Ink comprising colorant | Ink comprising colorant | Ink comprising colorant |
|---|---|---|---|---|---|
| INVINK-1 | C-INK | M-INK | Y-INK | B-INK | W-INK |

The composition of the colorant containing inkjet inks is listed in Table 11. The amounts of each ingredient is in wt. % with respect to the total weight of the ink.

TABLE 11

|  | C-INK | M-INK | Y-INK | B-INK |
|---|---|---|---|---|
| P.B.15 | 4.0 |  |  |  |
| P.V.19 |  | 4.0 |  |  |
| P.Y.120 |  |  | 4.0 |  |
| P.Bl.7 |  |  |  | 4.0 |
| Solsperse 39000 | 4.0 |  |  |  |
| Solsperse 32000 |  | 4.0 | 4.0 | 3.2 |
| DEGDEE | 18.6 | 22.0 | 18.27 | 52.80 |
| BGA | 50.83 | 70.00 | 27.33 |  |
| γ-butyro-lactone | 10.0 |  | 25.0 | 20.0 |
| TeEGDME | 10 |  | 20 | 20.0 |
| PVCAC | 2.5 |  | 1.0 |  |

Due to the transparency of the NIR absorbing non-aqueous inkjet ink INVINK-1, coloured 3D-objects can be obtained by using the ink set of Table 10.

The invention claimed is:

1. A non-aqueous inkjet ink comprising a near infrared absorbing particle, a dispersant, a glycerol ester from one, two, or three long-chain fatty acids in an amount from 1 wt. % to 80 wt. % with respect to the total weight of the ink, and a solvent, wherein the dispersant is a polymer comprising a functional group being (i) an acidic group or a salt thereof or (ii) an amino group and wherein the solvent is selected from the group consisting of ketones, esters, ethers, and alcohols.

2. The non-aqueous inkjet ink of claim 1, wherein the ink further comprises an inorganic or organic rheology modifier.

3. The non-aqueous inkjet ink of claim 1, wherein the acidic group is a carboxylic acid group or a salt thereof.

4. The non-aqueous inkjet ink of claim 1, wherein the polymer is selected from the group consisting of poly(esters), poly(acrylics), poly(urethanes), poly(amides), poly(ethers) and poly(styrenes), and combinations thereof.

5. The non-aqueous inkjet ink of claim 1, further comprising a mineral oil hydrocarbon in an amount of 10 wt. % or less with respect to the total weight of the ink.

6. The non-aqueous inkjet ink of claim 1, wherein the near infrared absorbing particle comprises an inorganic material selected from the group consisting of doped tin oxides, doped indium oxides, alkali metal tungsten oxides, rare earth hexaborides, alkali and/or transition metal (poly)phosphates, alkali and alkaline earth copper silicates, and transparent inorganic conductive oxides.

7. The non-aqueous inkjet ink of claim 1, wherein the near infrared particles have a diameter of 1 μm or less.

8. The non-aqueous inkjet ink of claim 1. further comprising a coloured pigment.

9. An ink set comprising a non-aqueous inkjet ink according to claim 1 and an inkjet ink comprising an organic solvent and a colorant.

10. An ink set comprising a non-aqueous inkjet ink according to claim 4 and an inkjet ink comprising an organic solvent and a colorant.

11. A 3D printing method, the method comprising the following steps:
   a) applying a polymeric build material,
   b) selectively applying the non-aqueous inkjet ink as defined in claim 1 on at least a portion of the polymeric build material by means of a jetting method, and
   c) exposing the polymeric material to IR radiation to fuse the at least portion of the polymeric material in contact with the non-aqueous inkjet ink.

12. A 3D printing method, the method comprising the following steps:
   a) applying a polymeric build material,
   b) selectively applying the non-aqueous inkjet ink as defined in claim 4 on at least a portion of the polymeric build material by means of a jetting method, and
   c) exposing the polymeric material to IR radiation to fuse the at least portion of the polymeric material in contact with the non-aqueous inkjet ink.

13. A 3D printing method, the method comprising the following steps:
   a) applying a polymeric build material,
   b) selectively applying the ink set as defined in claim 9 on at least a portion of the polymeric build material by means of a jetting method, and
   c) exposing the polymeric material to IR radiation to fuse the at least portion of the polymeric material in contact with the non-aqueous inkjet ink.

14. A 3D printing method, the method comprising the following steps:
   a) applying a polymeric build material,
   b) selectively applying the ink set as defined in claim 10 on at least a portion of the polymeric build material by means of a jetting method, and
   c) exposing the polymeric material to IR radiation to fuse the at least portion of the polymeric material in contact with the non-aqueous inkjet ink.

* * * * *